Aug. 1, 1950  M. M. M. BILLON  2,517,078
AUTOMATIC BRAKE CONTROL DEVICE
Filed Sept. 10, 1946  2 Sheets—Sheet 1
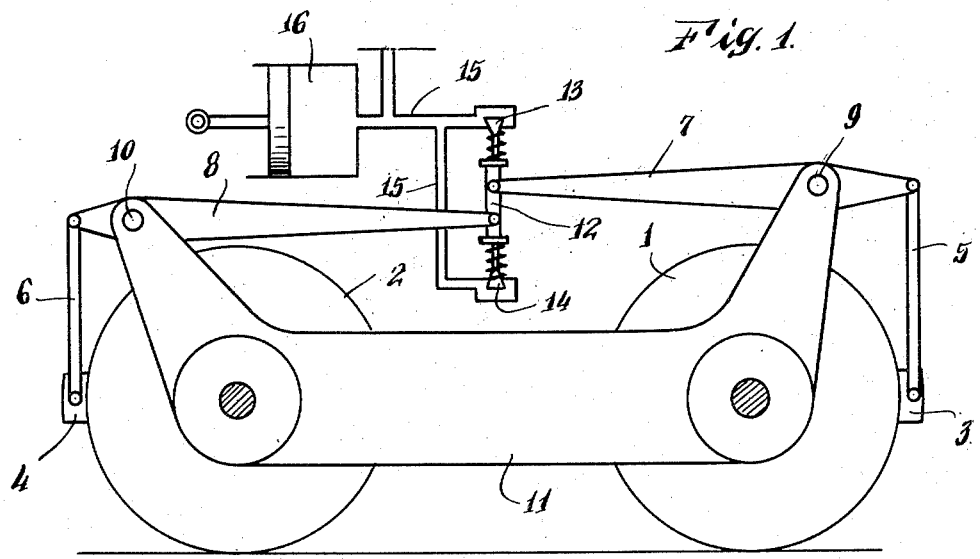
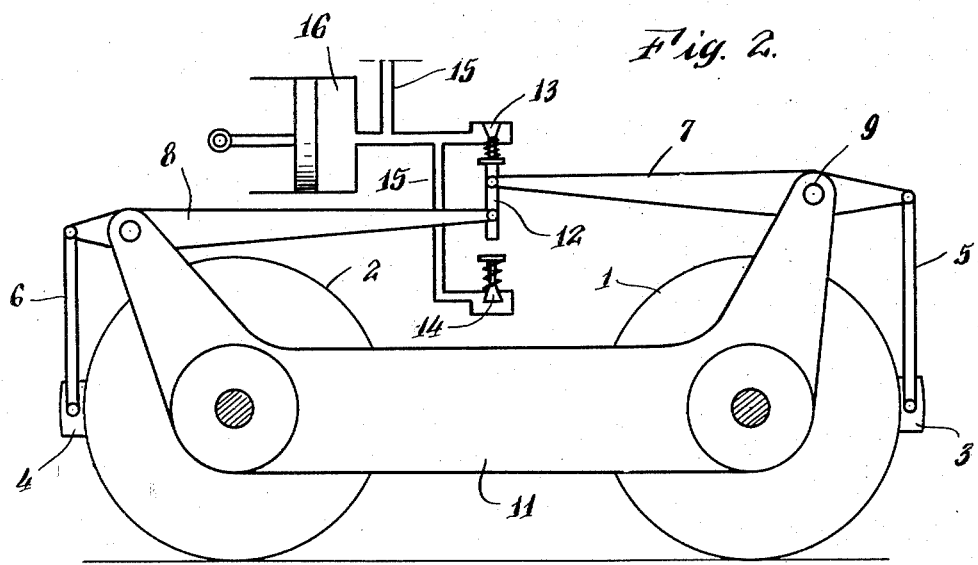
INVENTOR.
*Marcel Marie Maurice Billon*
BY
*Hazeltine, Lake & Co.*
AGENTS.

INVENTOR.
Marcel Marie Maurice Billon
BY
Hazeltine, Lake - Co.
AGENTS.

Patented Aug. 1, 1950

2,517,078

UNITED STATES PATENT OFFICE 2,517,078

AUTOMATIC BRAKE CONTROL DEVICE

Marcel Marie Maurice Billon, Besancon, France, assignor to Tecalemit Societe Anonyme, Paris, France, a joint-stock company of France Application September 10, 1946, Serial No. 695,881 In France September 14, 1945

5 Claims. (Cl. 188—153)

This invention relates to a method and a device for the automatic adjustment of brakes.

The invention first relates to a method for the automatic adjustment of brakes characterized by the feature that the braking reactions of two differently braked axles are set in opposition so that said reactions are balanced together during a period of normal braking. Releasing of the brakes is automatically controlled when the balance of the reactions is destroyed either because the braking power applied initiates stoppage of the most intensively braked axle which begins to stop thus causing a sudden and considerable increase of the braking reaction, or on complete stopping of the same axle which causes an important decrease of the braking reaction, or on complete stopping of both axles which causes identical braking reactions but which acts on the balance in a different manner, said method making it thus possible automatically to cease braking immediately before reaching the stopping limit or automatically to prevent complete stopping.

The invention generally covers this method regardless of the devices used for carrying out the same. However, the invention also covers a device making it possible to carry out said method in a particularly advantageous and efficacious manner.

The method and the devices used for attaining the above mentioned objects show the features which will appear from the following description and more particularly from the appended claims.

Devices for the automatic adjustment of the braking are shown by way of examples in the following drawings, in which:

Figure 1 is a diagrammatical sectional view showing the device in the balancing position.

Figure 2 is a sectional view showing the device of Figure 1 in the unbalanced position.

Figure 3:
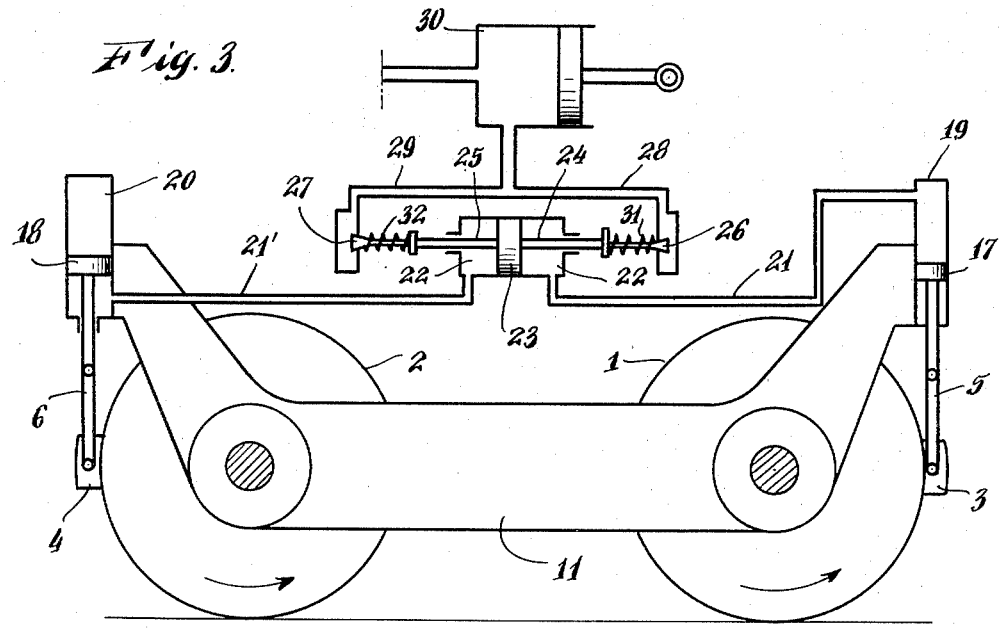
Figure 3 is a diagrammatical sectional view of a modification showing a hydraulic device in the balancing position.

According to the method of the invention the balancing operation is effected through any mechanical, hydraulic or other means for the braking reactions transmitted, on the one hand, by one of the connecting rods supporting the brake shoes of a more intensively braked axle and, on the other hand, by one of the connecting rods supporting the brake shoes of a less intensively braked axle.

It is known that one of the particularities of braking resides in the increase of the stress transmitted to the connecting rods supporting the brake shoes at the very moment when the axle begins to stop.

This increase of the stress which, moreover, corresponds to an increase of the retarding force applied to the braked vehicles, arises when the braked wheel begins to slow down. It persists during the whole slowing down and then falls suddenly to a very small value as soon as the wheel is completely stopped.

Owing to this fact, the balancing of the braking reactions transmitted by each connecting rod supporting the brake shoes of each axle is maintained during the whole time of the normal braking until the very moment one of the axles stops.

When the most intensively braked axle is stopped the sudden increase of the stress transmitted to the connecting rod by the brake shoes destroys the balance of the opposition device which immediately reacts upon the braking reduction mechanism.

Likewise, if one of the wheels of the axles is completely stopped the value of the sliding reaction of said wheel becomes negligible which results, therefore, in a lack of balance in the other direction, thus causing a reduction of the braking effect.

Owing to this fact, the method also makes it possible to prevent complete stopping.

The balancing connection can be made by various means, more particularly by means of levers which establish from one connecting rod to the other a reverse connection ratio with respect to the ratio of the braking rates of one and the other axle.

Figures 1 and 2 show a first form of execution of the device used for carrying out the above described method.

In said device the wheels 1 and 2 of a bogey are braked by the brake shoes 3 and 4 respectively, the respective connecting rods 5 and 6 of which are pivotally connected to the ends of the levers 7 and 8 journalled at 9 and 10 on the frame 11.

The ends of the levers 7 and 8 are connected by the connecting rod 12 which can act indifferently upwards or downwards upon the valves 13 and 14 which control the exhaust of the compressed air line 15 leading to the brake cylinder 16.

The brake gears (not shown) from brake cylinder 16 are established so as to insure a braking rate for the wheel 1 higher by a certain value than the braking rate applied to the wheel 2.

The right and left arms of the lever 7 and the right and left arms of the lever 8 are then established so as to insure equal and opposed reactions on the connecting rod 12. The device works in the following manner.

The balancing of the reactions being maintained until wheel 1 begins to slow down, the valves 13 and 14 remain closed; at the moment when the braking value becomes such that wheel 1 begins to stop, the reaction upon the connecting rod 5 suddenly increases; the balance is destroyed and the connecting rod 12 moves either downwards or upwards according to the direction of the rotation of the wheels 1 and 2.

This displacement has for its effect to displace one of the valves 13 or 14 from its seat which determines the emptying of the brake cylinder 16 until the tendency to stop ceases.

Since the forces acting upon the connecting rod 12 are considerable, the diameter of the valves 13 and 14 can be large enough for insuring an almost instantaneous emptying of the brake cylinder.

Thus, the device limits the braking automatically to the stopping valve.

The device can also prevent complete stopping in the following manner. If a defect in the working causes the complete stopping of the wheel 1, the reaction upon the connecting rod 12 changes its direction since the value of the sliding reaction becomes negligible. Owing to this fact, the connecting rod 12 immediately actuates the opposed valve. If the wheels 1 and 2 are stopped in succession, the sliding reactions of the wheels on the rails would become equal and, consequently, also the reactions transmitted to the connecting rods supporting the brake shoes. Since the transmission lever arms of said reactions are unequal, there would be again a displacement of the connecting rod 12 and the opening of one or the other exhaust valve.

Figure 4:
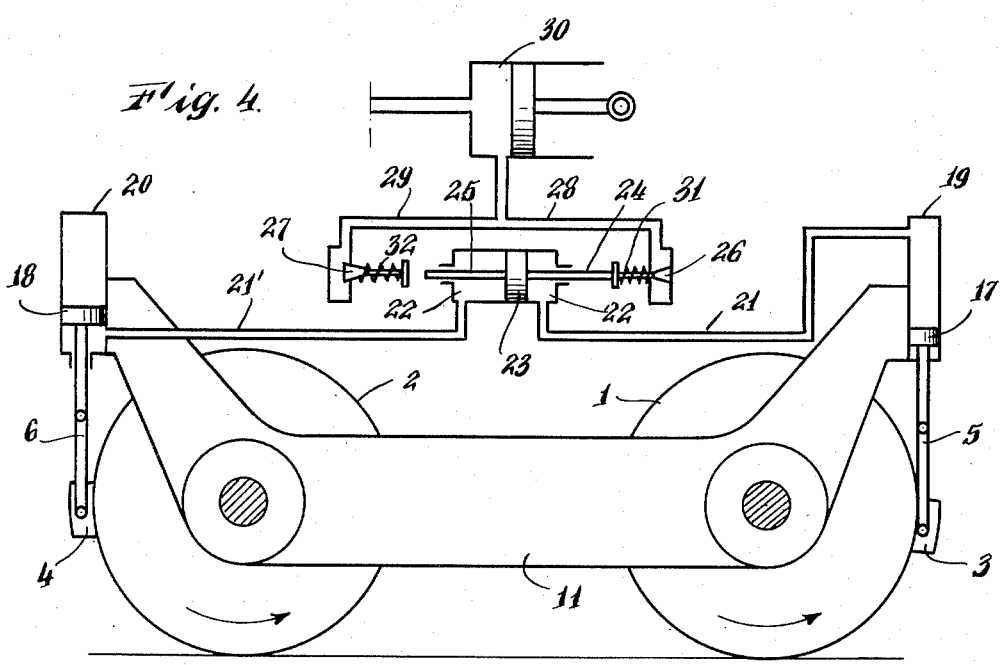
Figure 4 is a sectional view showing the device of Figure 3 in the unbalanced position.

The second form of execution of the invention shown in Figures 3 and 4 shows a similar automatic regulation device but of the hydraulic type.

In said device the connecting rods 5 and 6 are connected with the pistons 17 and 18 moving in the cylinders 19 and 20 respectively which are hydraulically connected by the lines 21 and 21' to the right and left side of a balancing cylinder 22 in which a piston 23 slides.

The piston rods 24 and 25 control the displacement from their seats of the valves 26 and 27 arranged in exhaust lines 28 and 29 of the brake cylinder 30.

The exhaust valves 26 and 27 are maintained closed by springs 31 and 32.

The sections of the pistons 17 and 18 are established in the reverse ratio of the braking rates applied to the axles 1 and 2 respectively.

The device works as follows.

So long as the braking remains normal, the reaction transmitted by the connecting rods 3 and 5 remains higher than the reaction transmitted by the connecting rods 4 and 6.

But as the section of piston 17 is smaller than the section of piston 18, according to the ratio of the reactions the pressure is the same on the right and left faces of balancing piston 23.

When stopping occurs on wheel 1, which is the most intensively braked, the reaction transmitted by the connecting rod 5 suddenly increases.

The piston 23 moves, carrying with it the piston rods 24 and 25, which has for its effect to lift one of the exhaust valves 26 or 27 until the stopping has ceased.

If, in spite of the opening of one of the exhaust valves, a total stopping of wheel 1 occurs the sliding reaction of wheel 1 on the rail instantaneously falls to a very small value.

The device works in the opposed direction thus causing the opening of the second valve.

Finally, if both wheels 1 and 2 are stopped the connecting rods 5 and 6 transmit equal reactions to the pistons 17 and 18.

The pressure difference on both faces of piston 23 which is a function of the ratios of the sections of the pistons, causes the lifting of one of the exhaust valves 29 or 30.

I claim:

1. In a device for automatic adjustment of braking power, two axles, means for differently braking said axles, a brake cylinder, a first exhaust valve for the brake cylinder, a second exhaust valve for the brake cylinder, a connecting rod between both valves controlling the opening of one or the other valve according to the direction of its displacement, a first rocking rod connecting the braking means of the first axle with the valve control rod, a second rocking rod connecting the braking means of the second axle with the valve control rod, said second rocking rod acting on the valve control rod in the reverse direction to said second rocking rod.

2. In a device for automatic adjustment of braking power, two axles, means for differently braking said axles, a brake cylinder, a first exhaust valve for the brake cylinder, a second exhaust valve for the brake cylinder, a first hydraulic piston controlled by the braking means of the first axle, a second hydraulic piston controlled by the braking means of the second axle, a balancing piston one of the faces of which is controlled by the first hydraulic piston while the other face is controlled by the second hydraulic piston, a rod controlled by the balancing piston mounted between both valves and controlling the opening of one or the other valve according to the direction of its displacement.

3. In a device for automatic adjustment of braking power, two axles, means for differently braking said axles, a brake cylinder, a first exhaust valve for the brake cylinder, a second exhaust valve for the brake cylinder, a first hydraulic piston controlled by the braking means of the first cylinder, a second hydraulic piston controlled by the braking means of the second cylinder, the ratio between the surfaces of both pistons being equal to the ratio between the braking reactions of both axles, a balancing piston one of the faces of which is controlled by the first hydraulic piston while the other face is controlled by the second hydraulic piston, a rod controlled by the balancing piston mounted between both valves and controlling the opening of one or the other valve according to the direction of its displacement.

4. In a device for automatic adjustment of braking power, two axles, means for differently braking said axles, a balancing device for balancing the braking reaction of both axles, a brake cylinder, means connecting said cylinder and braking means, means for setting the brake cylinder on exhaust, and connecting means between the balancing device and the exhaust setting means for controlling said exhaust means responsive to movement of the balancing device.

5. In a device for automatic adjustment of braking power, two axles, means for differently braking said axles, a brake cylinder, exhaust valves for the brake cylinder, a connecting rod controlling said valves, a first rocking rod connecting the braking means for the first axle to the valve control rod, and a second rocking rod connecting the braking means for the second axle to the valve control rod, said first and second rocking rods acting upon the valve control rod in mutually opposed directions.

MARCEL MARIE MAURICE BILLON.

REFERENCES CITED

The following references are of record in the file of this patent:

UNITED STATES PATENTS

| Number | Name | Date |
|---|---|---|
| 214,337 | Westinghouse | Apr. 15, 1879 |
| 1,122,225 | Abel | Dec. 22, 1914 |
| 2,179,399 | Browall | Nov. 7, 1939 |

FOREIGN PATENTS

| Number | Country | Date |
|---|---|---|
| 7,589 | Great Britain | A. D. 1908 |
| 329,240 | Italy | Sept. 3, 1935 |